US012020019B2

(12) United States Patent
Rojas Fonseca et al.

(10) Patent No.: US 12,020,019 B2
(45) Date of Patent: Jun. 25, 2024

(54) IN-SERVICE SOFTWARE UPGRADE CENTRALIZED DATABASE VERSIONING AND MIGRATION

(71) Applicant: HEWLETT PACKARD ENTERPRISE DEVELOPMENT LP, Houston, TX (US)

(72) Inventors: Francisco Jose Rojas Fonseca, San Jose (CR); Nick E. Demmon, Roseville, CA (US); David Corrales Lopez, San Jose (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 146 days.

(21) Appl. No.: 17/876,937

(22) Filed: Jul. 29, 2022

(65) Prior Publication Data
US 2024/0036852 A1 Feb. 1, 2024

(51) Int. Cl.
G06F 8/65 (2018.01)
G06F 16/21 (2019.01)
(52) U.S. Cl.
CPC .............. G06F 8/65 (2013.01); G06F 16/214 (2019.01); G06F 16/219 (2019.01)
(58) Field of Classification Search
None
See application file for complete search history.

(56) References Cited

U.S. PATENT DOCUMENTS

| | | | |
|---|---|---|---|
| 8,782,632 B1* | 7/2014 | Chigurapati | H04L 41/082 717/172 |
| 2012/0072893 A1* | 3/2012 | Gupta | G06F 8/656 717/168 |
| 2012/0072894 A1* | 3/2012 | Wang | G06F 8/656 710/33 |
| 2016/0274888 A1* | 9/2016 | Eliazer | G06F 8/658 |
| 2016/0364231 A1* | 12/2016 | Tati | G06F 8/656 |
| 2019/0303129 A1* | 10/2019 | Nidumolu | H04L 45/563 |

* cited by examiner

Primary Examiner — Qing Chen
(74) Attorney, Agent, or Firm — Sheppard Mullin Richter & Hampton LLP

(57) ABSTRACT

Systems and methods are provided for in-service software upgrades using centralize database versioning and migrations. The systems and methods described herein can intercept protocol messages between a client and a network device and run a first control plane comprising an origin state database and a plurality of un-migrated services. The system can generate a target state data model, wherein an origin state data model associated with the origin state database migrates to the target state data model, and copy the origin state database. The system can migrate second control plane software to the target state database and operate un-migrated services in accordance with the first control plane software and the copied origin state database while operating migrated services in accordance with the second control plane software and the target state database.

20 Claims, 9 Drawing Sheets

IN-SERVICE SOFTWARE UPGRADE CENTRALIZED DATABASE VERSIONING AND MIGRATION

BACKGROUND

This disclosure is generally related to in-service software upgrade (ISSU) of network devices. ISSU refers to the upgrading of software/firmware images on a device or system without impacting services offered to users and connected devices. For example, a client device may use some version of an application programming interface (API) to communicate with a database, and when a schema/model version of the database changes, unless the client device's API is also updated, that client device will lose service.

BRIEF DESCRIPTION OF THE DRAWINGS

The present disclosure, in accordance with one or more various examples, is described in detail with reference to the following figures. The figures are provided for purposes of illustration only and merely depict typical examples.

Figure 1:
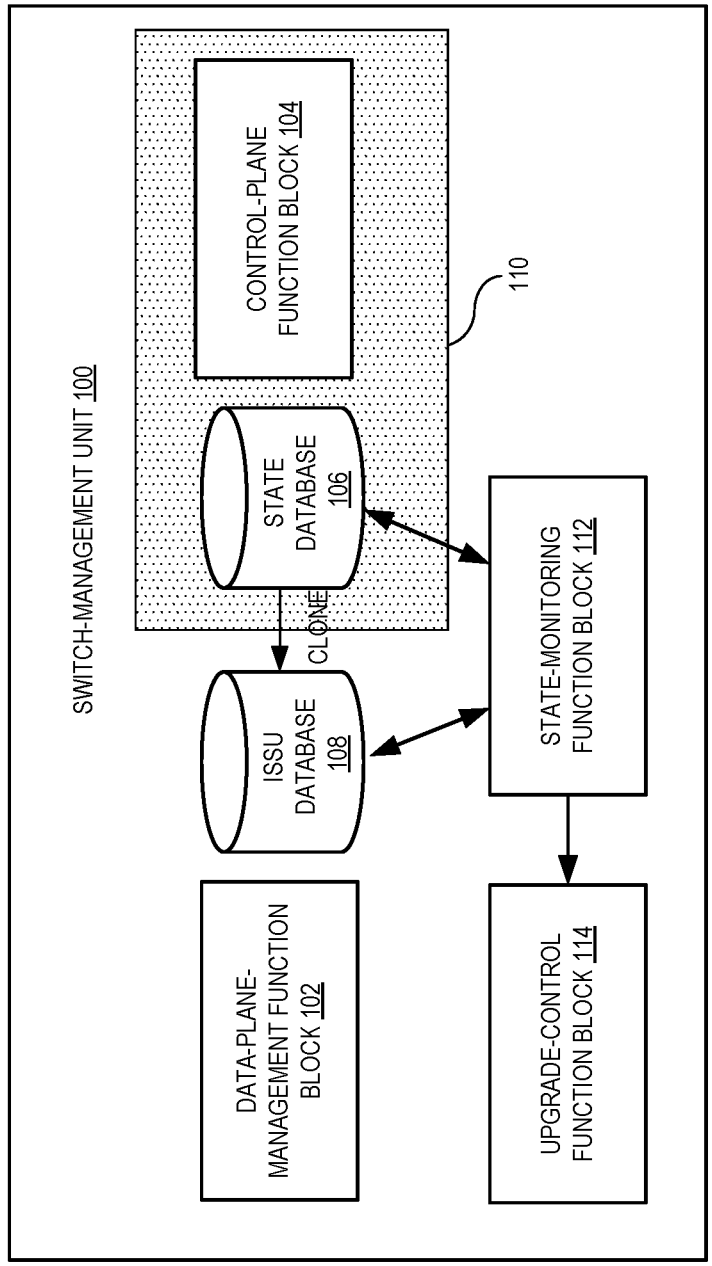
FIG. 1 illustrates an example system incorporating ISSU capabilities in accordance with various examples.

The figures are not exhaustive and do not limit the present disclosure to the precise form disclosed.

DETAILED DESCRIPTION

In implementing an ISSU, a consistent problem involves upgrading the software while keeping the forwarding plane and other device services operational. Traditional systems can involve distributed ISSU models, which can comprise copies of ISSU elements, which are different relevant elements of the system running concurrently on two different versions: the origin and target states. The origin state can represent a state of the system before a development in software, and the target state can represent a state of the system after the development in software. ISSU elements can comprise services, data models, communication channels, or any other software that can upgraded as part of the ISSU process. A traditional distributed ISSU model can comprise different databases and services. These services may comprise various applications and/or software based on the needs of a client device. These models usually require versioning mechanisms throughout the system on each of the system's APIs and data models. Versioning can involve assigning unique version names and/or version numbers corresponding to new developments in the software. Because traditional systems can require versioning mechanisms throughout the system, every connection between a service and a state database would need to be versioned accordingly. This configuration can also impact the ordering of when services receive API calls. The main problem with the traditional ISSU model is that it can require multiple service copies plus different data models. This can result in a lack of support for services while completing ISSU or services that are noted as not supported on different versions. As a result, the user experience can be cumbersome and error prone. As an example, performing an ISSU might require users to shutdown unsupported services prior to the upgrade or read complex release notes to understand what is supported.

Aspects of the technology disclosed herein may implement a centralized database, wherein the services involved in ISSU can comprise bidirectional connections directly to the state database. This can reduce the number of connections that need to be versioned and allow users to access available services during an ISSU. Accordingly, examples are directed to a device that leverages a centralized state database to allow migration of state and configuration information from an origin state database to a target state database, and by virtue of migrating state, allow for the implementation of ISSU to upgrade the device's software without impacting services provided by the device. The centralized state database can be implemented, for example, as part of an Open vSwitch Database (OVSDB) of an AOS-CX switch operating system or any other database system. In particular, implementations may be configured such that all services can connect to the centralized state database, and store their respective configurations and states therein. A migration schema can be used, e.g., a schema migration OVSDB proxy, to migrate from an origin to target state. That is, state and configuration information can migrate from an origin state database/model to a target state database/model by intercepting or capturing OVSDB protocol messaging, translating the state and configuration data, and bringing up the target state database/model using the translated state and configuration data. Those services whose state was migrated can also migrate to the target state database by stopping the process that provides the service (running the old software version) and starting a new service, e.g., via daemons on the new software version. This can be performed iteratively across all versions/services as appropriate.

Examples described herein may allow a user to perform upgrades without shutting down services. This can be accomplished by detaching the control plane (i.e. where services are operated) from the data plane so that the device can continue servicing and monitoring the network while maintaining a snapshot of the data plane configuration when the ISSU started. This snapshot allows for services to continue operating while other services are migrated to the target system. By having a detached control plane, the device can continue monitoring the network and internal device state, which allows the system to react to errors during ISSU processes. Detachment can be accomplished through a temporary copy of the origin state database that contains the entire state. This can essentially freeze the state database components so that un-migrated services can continue to operate. The control plane can remain on the state database so that services can move independently from the data plane. Thus, control plane software can be upgraded separately while retaining the state of the data plane.

Implementing a centralized database system as described above allows for full ISSU support to both modular chassis and stackable switches. Modular chassis switches may be implemented as network switches that are configurable with various line-cards. A chassis can comprise a number of fixed slots to receive various types of line-cards. In contrast to fixed configuration switches, chassis switches can operate as a single integrated system, configured such that one failed line-card would not affect the entire chassis. Stackable switches may be implemented as network switches that can be stacked to increase the number of ports. Ports can be increased by adding another switch to the stack. Stackable switches can reduce the space needed to support a particular port density. Examples described herein can provide full ISSU support to either type of switch. By providing a live migration, services can continue to operate while performing ISSU, removing the need to potentially move the chassis or stack of switches into a split-brain topology, i.e. where the control plane is split into two active pieces. This split would result in each part of the control plane controlling a particular part of the device or stack. In traditional systems, this results in disabling ports and services in one or more active control plane. The provision of a proxy allows the system to maintain one control plane and migrate services to the target version as opposed to systems that need to manage multiple control planes to execute one software upgrade.

FIG. 1 illustrates an example switch-management unit that can implement a centralized ISSU model. Switch-management unit 100 can include various software and hardware components that manage and control the operations of the switch, such as implementing protocols and forwarding packets. Switch-management unit 100 can include a data-plane management function block 102, a control-plane function block 104, and a state database 106. Data-plane-management function block 102 can configure the switch hardware (e.g., a packet-forwarding application-specific integrated circuit (ASIC)). Control-plane function block 104 can receive and send packets (e.g., control packets) to the network or managing user-visible services. State database 106 can include state information associated with the control plane and the data plane. The data-plane state of the switch describes how the data-plane hardware is configured. The control-plane state of the switch is the state that the management software of the switch shares with the network at large and can include networking protocols, e.g., Spanning Tree Protocol (STP), Open Shortest Path First (OSPF) protocol, Border Gateway Protocol (BGP), etc.

Moreover, switch-management unit 100 can include a temporary database, referred to as ISSU database (or simply an upgrade database) 108. ISSU database 108 can be generated in response to an upgrade command (e.g., an ISSU command). For example, in response to receiving an upgrade command, switch-management unit 100 can generate ISSU database 108 (e.g., in real time) by copying entire state database 106. In this example, ISSU database 108 is generated as a clone of state database 106 and includes both the data-plane state and the control-plane state of the switch at the time of cloning. According to one aspect, copying all contents of state database 106 to ISSU database 108 can be done using a smart "copy-on-write" mechanism that only duplicates what becomes different, thereby reducing the memory requirements for cloning state database 106. This can be implemented using functionalities available in a Linux kernel.

In a separate example, in response to receiving an upgrade command, switch-management unit 100 can generate ISSU database 108 by copying only the data-plane state information included in state database 106. This way, ISSU database 108 only contains the data-plane state of the switch at the current time instant. The generation of a temporary database (e.g., ISSU database 108) to maintain a copy of the pre-upgrade data-plane state enables the detachment between data-plane-management function block 102 and control-plane function block 104. In fact, control-plane function block 104 and state database 106 can form a detached control plane 110 that continues to operate normally (e.g., sending and receiving control packets) when data-plane-management function block 102 is being upgraded, without shutting down any control protocol. On the other hand, the upgrade of data-plane management function block 102 can be performed based on the data-plane state stored in ISSU database 108. Note that, during upgrade, the detached control plane does not affect the pre-upgrade data-plane state stored in ISSU database 108 such that the data-plane state corresponds to the state of a stable network before the upgrade.

Switch-management unit 100 can include a state-monitoring function block 112 for monitoring the data-plane state and the control-plane state included in both databases (i.e., state database 106 and ISSU database 108) in order to monitor services provided by the switch (e.g., monitoring network events as well as events on the switch). State-monitoring function block 112 can be activated by the upgrade command, which may come from the user or a process. Errors on the switch (e.g., hardware failure) or in the network (e.g., link failure) or network events that may affect the upgrade (e.g., a network reconfiguration) can also be monitored by monitoring changes in the state.

To reduce the amount of resources needed to perform the monitoring, state-monitoring function block 112 can be configured to not monitor all services or all aspects of the network. According to one aspect, state-monitoring function block 112 can be configured to monitor services selected based on a set of pre-defined criteria. The service-selection criteria can be defined by the user or generated automatically by the upgrade process. For example, state-monitoring function block 112 can be configured to monitor services that are deemed critical (e.g., services critical to the application or services affecting the stability of the network). A service or group of services can be defined as critical based on their type and the application need. For example, for financial applications, services associated with user authentication can be considered critical.

In addition to their type, services may also be defined as critical based on other criteria, such as ports, interfaces, overlays (or tunnels), and AAA (Authentication, Authorization, and Accounting) events, that are associated with the services. During the upgrade process, state-monitoring function block 112 can be configured to monitor events that may affect these services such that, when needed, the upgrade process can be aborted to minimize the overall impact beyond the device being upgraded. Examples of critical services can include control-plane protocols, control-plane packet management, data-plane services, and physical ports. For example, a port or a set of ports on a switch can be defined as critical (e.g., for being connected to core switches). Accordingly, state-monitoring function block 112 can be configured to monitor the state of these ports during the upgrade process. If state-monitoring function block 112 detects an event (e.g., a link event or a port failure) associated with the port that requires an action from the switch to avoid a network-wide outage, the switch can perform the action. In one example, the switch can abort or roll back the upgrade process to reset the switch to a previous state where it can take the required action.

Moreover, certain protocols can also be defined as critical such that state monitoring function block 112 can be configured to monitor network events relevant to the critical protocols. For example, the user may define STP as critical. Consequently, state-monitoring function block 112 can be configured to monitor network reconvergence events, which may lead to loops in the network. In addition to, or as an alternative to, events occurring in the network or on the switch hardware, state-monitoring function block 112 can be configured to monitor internal failures (e.g., process crashes) of switch management unit 100 that may affect the network and cannot be recovered during the upgrade process.

Switch-management unit 100 can further include an upgrade-control function block 114 for controlling the upgrade process. More specifically, upgrade-control function block 114 can be configured to receive event notifications from state monitoring function block 112 and perform an action in response to one or more events meeting a triggering condition. According to one aspect, actions performed by upgrade control function block 114 can include: pausing the upgrade process, rolling back the upgrade process to a previous state, aborting the upgrade process, rebooting the device being upgraded, etc. Examples of the triggering condition can include: possibility of causing the upgrade to fail, possibility of causing instability in the network, possibility of causing failure or interruption of critical services, etc. For example, during the upgrade process, state-monitoring function block 112 may detect failure of a port connected to a core switch, and upgrade-control function block 114 may determine that ignoring such a failure during the upgrade may result in an unstable network. In response, upgrade-control function block 114 may take an action to abort the upgrade process to allow the switch to take remedial actions, such as redirecting traffic to a backup port. Once the problem is solved, upgrade-control function block 114 can restart the upgrade process. In another example, during the upgrade process, state-monitoring function block 112 detects a reconvergence event in the network, which may lead to traffic loops. In response, upgrade-control function block 114 may abort the upgrade process to allow the switch to react to the network reconvergence event to prevent network-wide traffic loops.

Figure 2:
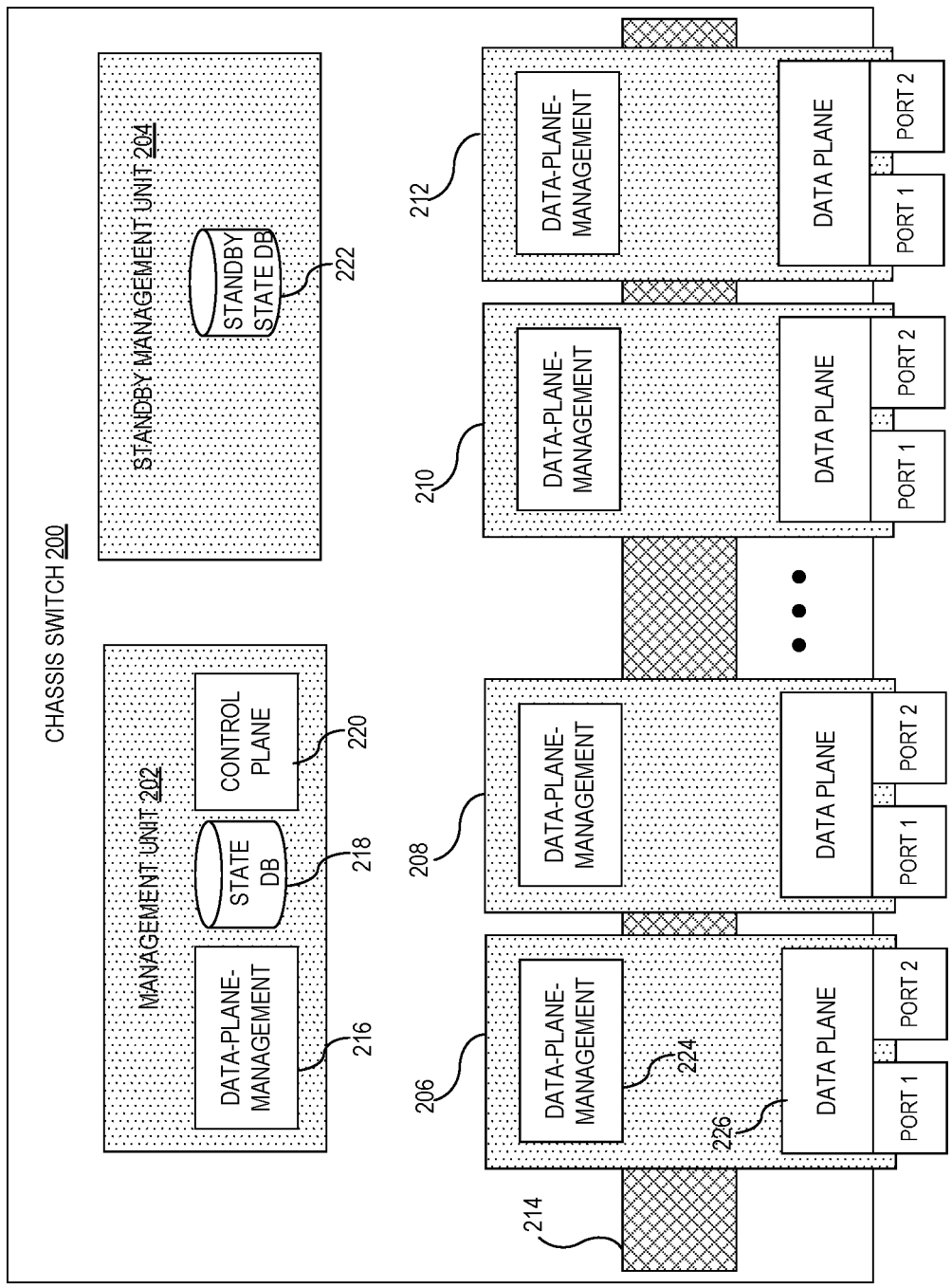
FIG. 2 illustrates an example switch with ISSU capabilities in accordance with various examples.

FIG. 2 illustrates an example distributed chassis switch with ISSU capabilities, according to one aspect of the application. In FIG. 2, chassis switch 200 includes a management unit 202, a standby management unit 204, and a number of line cards (e.g., line cards 206-212) attached to a backplane 214.

According to one example, management unit 202 and standby management unit 204 can each include processing resources (e.g., processors and memories) and various interfaces (not shown in FIG. 2) that can facilitate the management and control of chassis switch 200. Moreover, management unit 202 can include a data-plane-management sub-unit 216, a state database 218, and a control-plane sub-unit 220. State database 218 can store information associated with the data-plane state and the control-plane state of chassis switch 200. Standby management unit 204 can provide redundancy and is normally placed in a standby mode with its own data-management sub-unit and control-plane sub-unit not activated (hence not shown in FIG. 2A). Standby management unit 204 can include a standby state database 222, which can be synchronized with state database 218 along with corresponding configurations.

In the example shown in FIG. 2, chassis switch 200 has a distributed architecture, meaning that each line card can have its own built-in processing resources (e.g., processors and memories) to manage data-plane hardware on the line card. For example, line card 206 can include a data-plane-management sub-unit 224 that can receive management packets from data-plane-management sub-unit 216 in management unit 202 to manage/control data-plane hardware 226 on line card 206. FIG. 2 also shows that each line card can include multiple ports (e.g., port 1 and port 2) for interfacing with the network at large (e.g., sending and receiving packets to and from the network).

Figure 3:
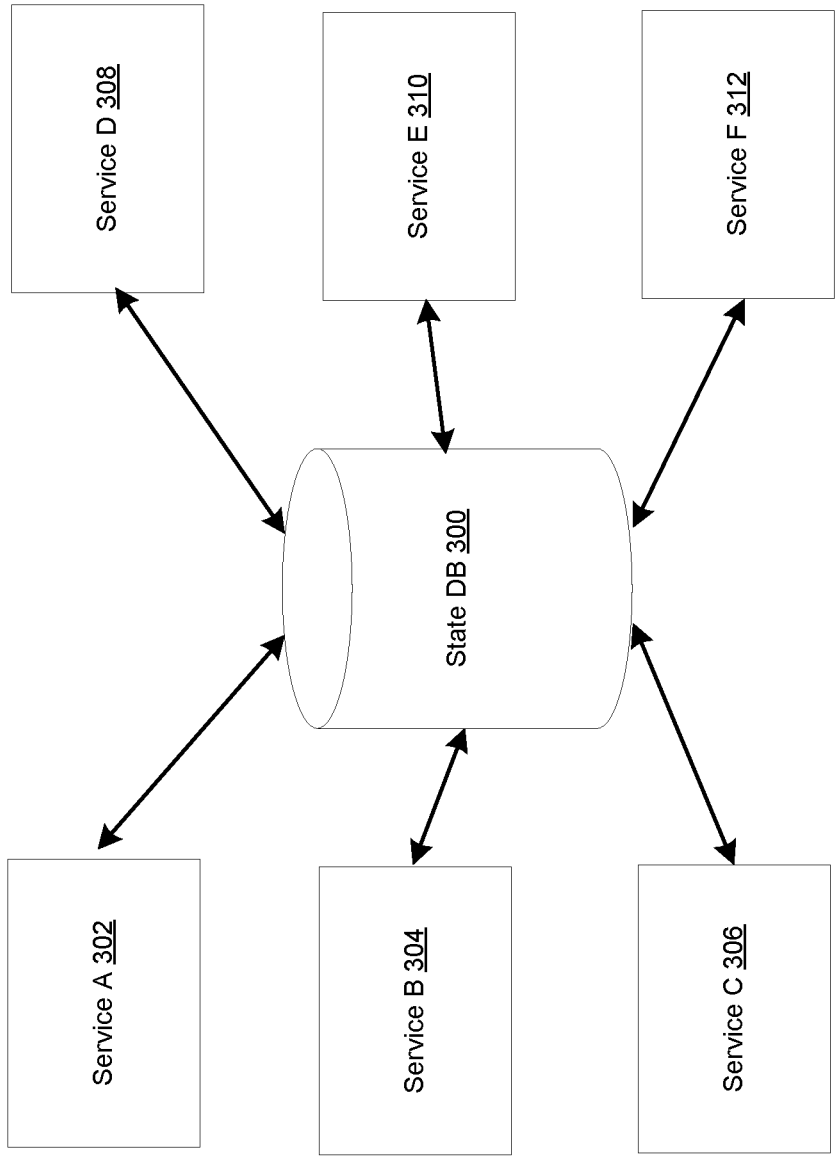
FIG. 3 illustrates an example centralized database in accordance with various examples

FIG. 3 illustrates an example of a centralized ISSU system in accordance with an aspect of the disclosed technology. As described above, state database 300 can include state information associated with the control plane and the data plane (e.g. state database 106). Services A-F 302-306 can connect to state database 300 to run on the same software version. State database 300 may comprise the only mechanism to communicate states between state database 300 and services A-F 302-306. This can differ from a non-centralized database, in which services A-F 302-306 would be able to communicate without a central connection mechanism, i.e. state database 300. Since every interaction in a non-centralized system can slightly differ, ISSU can be difficult since each service would require individual handling. Having a centralized connection avoids having a granular and individual service API versioning as described above, where multiple different connections need to be versioned. Instead, the configuration and state migration can be accomplished solely between database servers. This can be accomplished through a schema migration framework OVSDB proxy (described further below) which can perform a live migration of the origin version's data model to the target's model. The target version may be migrated inside a container, virtualized machine, or a standby or active redundant management module.

Figure 4:
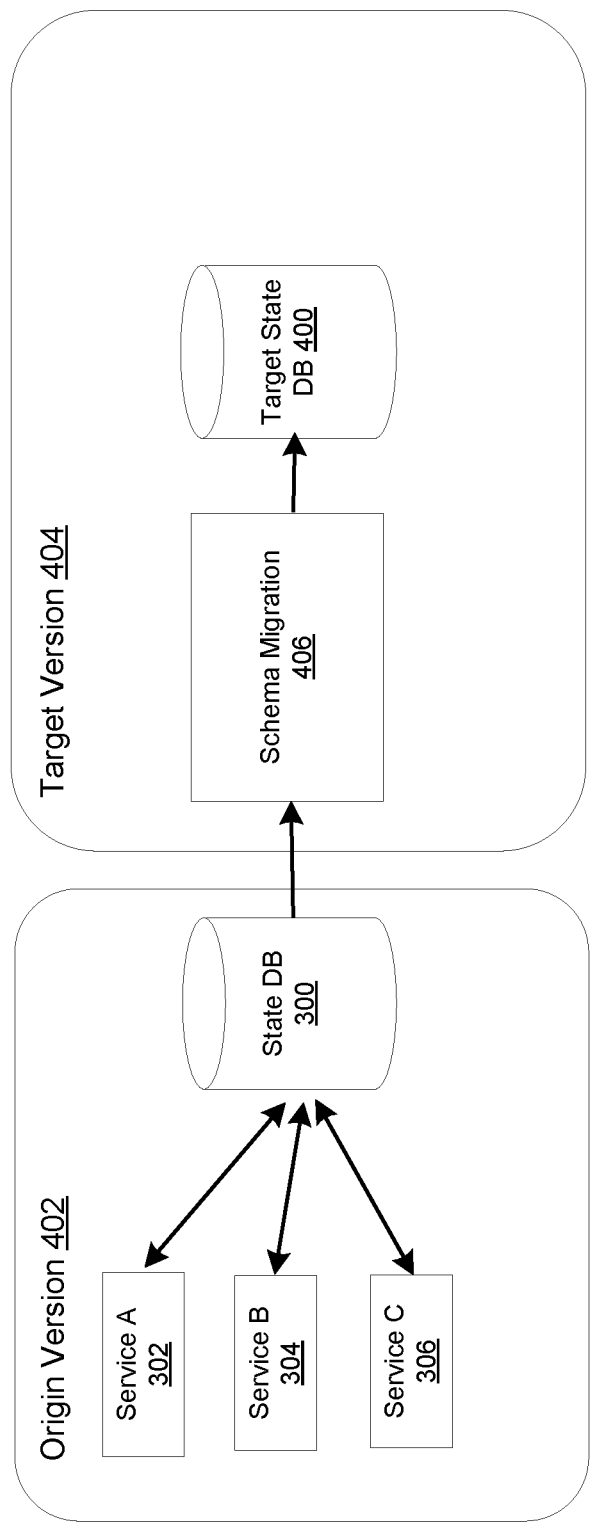
FIG. 4 illustrates an example migration from an origin version to a target version in accordance with various examples.

FIG. 4 illustrates a centralized ISSU system as described above as it interacts with origin and target versions 402 and 404. Origin version 402 and target version 404 may each comprise a control plane to represent the services and other software that are operating on a particular version of firmware. Origin version 402 can comprise services A-C 302-306 and state database 300. Target state database 400 can comprise the updated state database after schema migration 406 is accomplished. A copy of the origin state database can be retained in origin version 402 to continue running services A-C 302-306 on the old software. As described above, services 302-306 may comprise various applications and/or software based on the needs of a client device. Services 302-306 may be migrated to the target version through schema migration 406.

Figure 5:
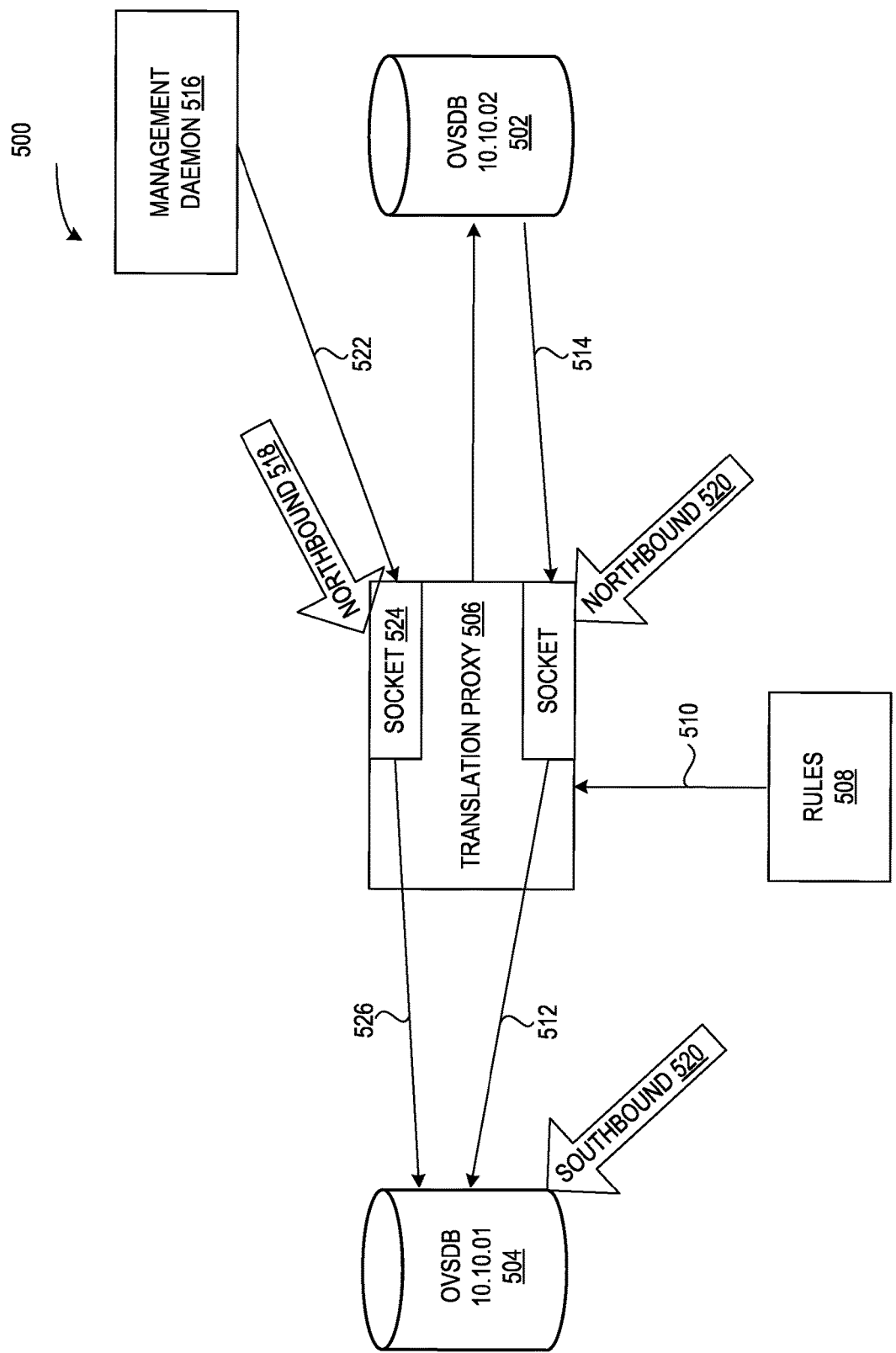
FIG. 5 illustrates an example system for schema migration in accordance with various examples.

FIG. 5 illustrates an example schema migration system 500 with entities and communications that facilitate an in-service software upgrade, in accordance with an aspect of the disclosed technology. In this example, an OVSDB 10.10.02 server 502 (which is running a newer version 10.10.02 of the schema model) can communicate with an OVSDB 10.10.01 server 504 (which is running an older version 10.10.01 of a schema model). The system can establish a proxy session by creating a first northbound communication session 190 (between OSVDB 10.10.02 server 502 and translation proxy 506) and a second southbound communication session 191 (between translation proxy 506 and OVSDB 10.10.01 server 186).

OVSDB 10.10.02 server 502 can send a request (via a communication 514), which can be dispatched to and received by translation proxy 506. Translation proxy 506 can perform the necessary translations (using rules 508 loaded via communication 510 and further using data as described above in relation to FIG. 1), and can send the translated request to OVSDB 10.10.01 server 504 (via a communication 512). OVSDB 10.10.01 server 504 can send a response back in reverse to translation proxy 506, which can perform any necessary reverse translations (via a reverse of communications 512 and 514).

In another aspect, management daemon 516 can initiate or establish a proxy session, which creates a first northbound communication session 520 (between management daemon 516 and translation proxy 506) and a second southbound communication session 518 (as similarly indicated by general southbound connection 520) (between translation proxy 506 and OVSDB 10.10.01 server 504. Management daemon 516 can send and receive information in a similar manner as described above for OVSDB 10.10.02 server 502 (i.e., via a communication 522, socket 524 of translation proxy 506, and communication 526, including in a reverse direction).

Figure 6A:
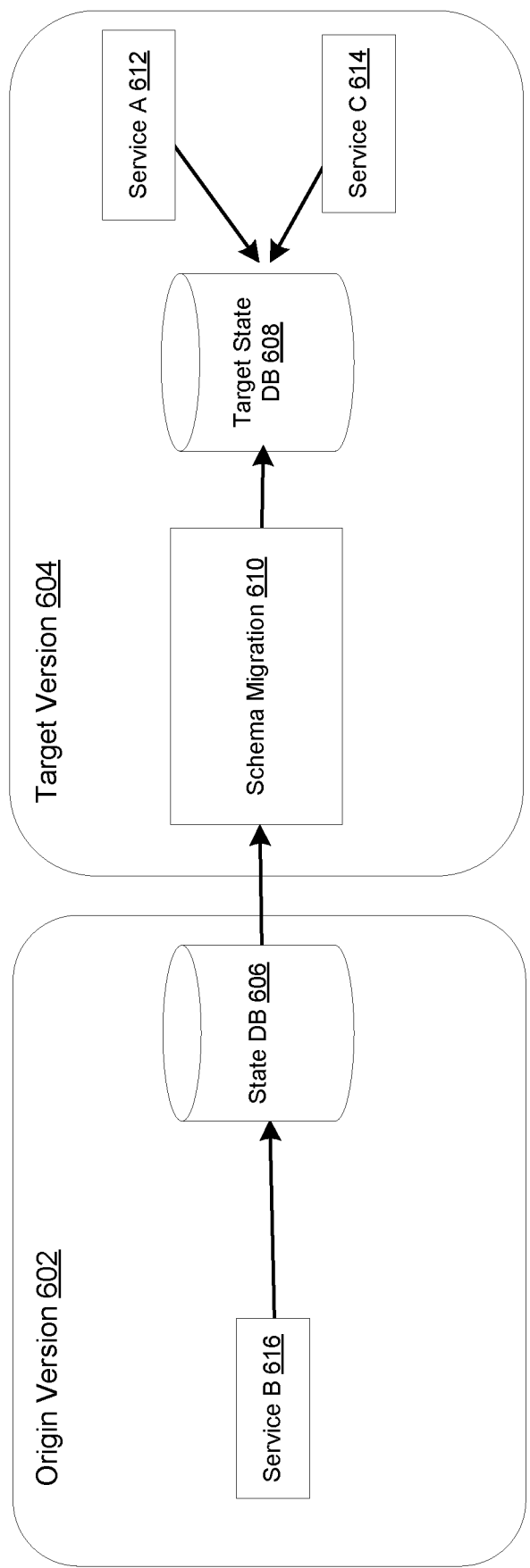
FIG. 6A illustrates an example system incorporating un-migrated and migrated components in accordance with various examples.

FIG. 6A illustrates an example of a migration of services to the target version after the state database is migrated, in accordance with an aspect of the disclosed technology. Services can be migrated after the state database and any other configuration modules are migrated to the target version. This can be accomplished by stopping the process providing the old software services and starting a new process on the new software version. The new software can be deployed on a standby management module or as a hot patch.

The standby management module may operate on a warm standby mode or a nonstop switching mode, with either mode as the default. In warm-standby mode, the origin and target versions may not sync continuously with the standby management module. The standby management module can load to a certain point, sync basic files, and complete configuration if the control planes of the origin and target versions fail or if a user changes the control planes. In nonstop switching mode, the standby management module may sync continuously with the origin and target versions so that all services and configuration files associated with the services are the same on both the standby module and the origin and control planes. The standby management module can replace the control planes as an active management module. A hot patch may be provided to resolve a target set of errors with no other changes in the software. The hot patch may be installed with a specific software release according to specific issues identified by developers. The hot patch may resolve some or all errors, meaning that the system may require future updates to the target software.

The sequence of stopping and starting processes can be repeated until all services are migrated. Schema migration 610 may allow old service B 616 to publish data to target state database 608 and allow new services A and C 612 and 614 to send data to old state database 606 to communicate with old service B 616. This allows services A-C to publish data without needing a copy of the exact schema old state database 606 uses. When all processes are migrated old state database 606 may be stopped to return the system to a single centralized database, i.e. with target state database 608 as the sole database. This can be accomplished when all state and configuration services are migrated to the target version.

Figure 6B:
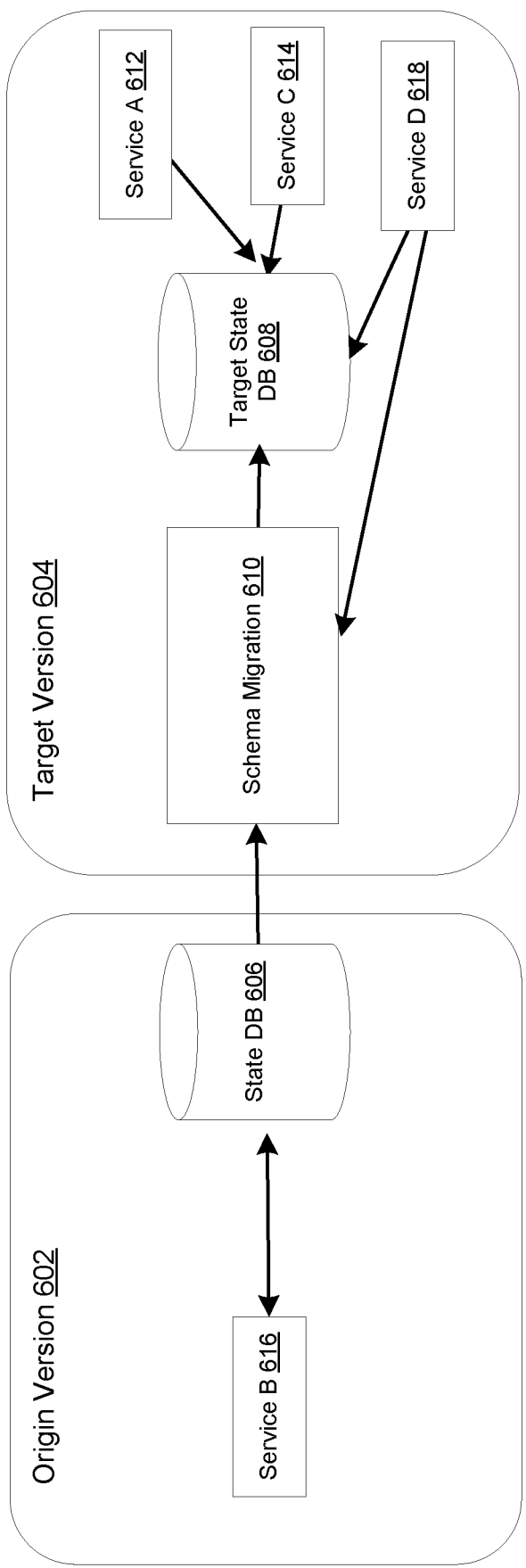
FIG. 6B illustrates another example system incorporating un-migrated and migrated components, wherein target version components connect to the origin and target versions.

FIG. 6B illustrates an example system similar to FIG. 6A, comprising additional service D 618 in accordance with an aspect of the disclosed technology. Schema migration 610 can operate in a bidirectional manner, allowing services running on the target version to connect to the origin state database 606. This allows for control or monitoring services to connect to both the origin and target versions and implement all logic to perform the transition to the target version. This can allow service D 618 to interact with service B 616 to maintain any updates with communications to service B 616.

Figure 7:
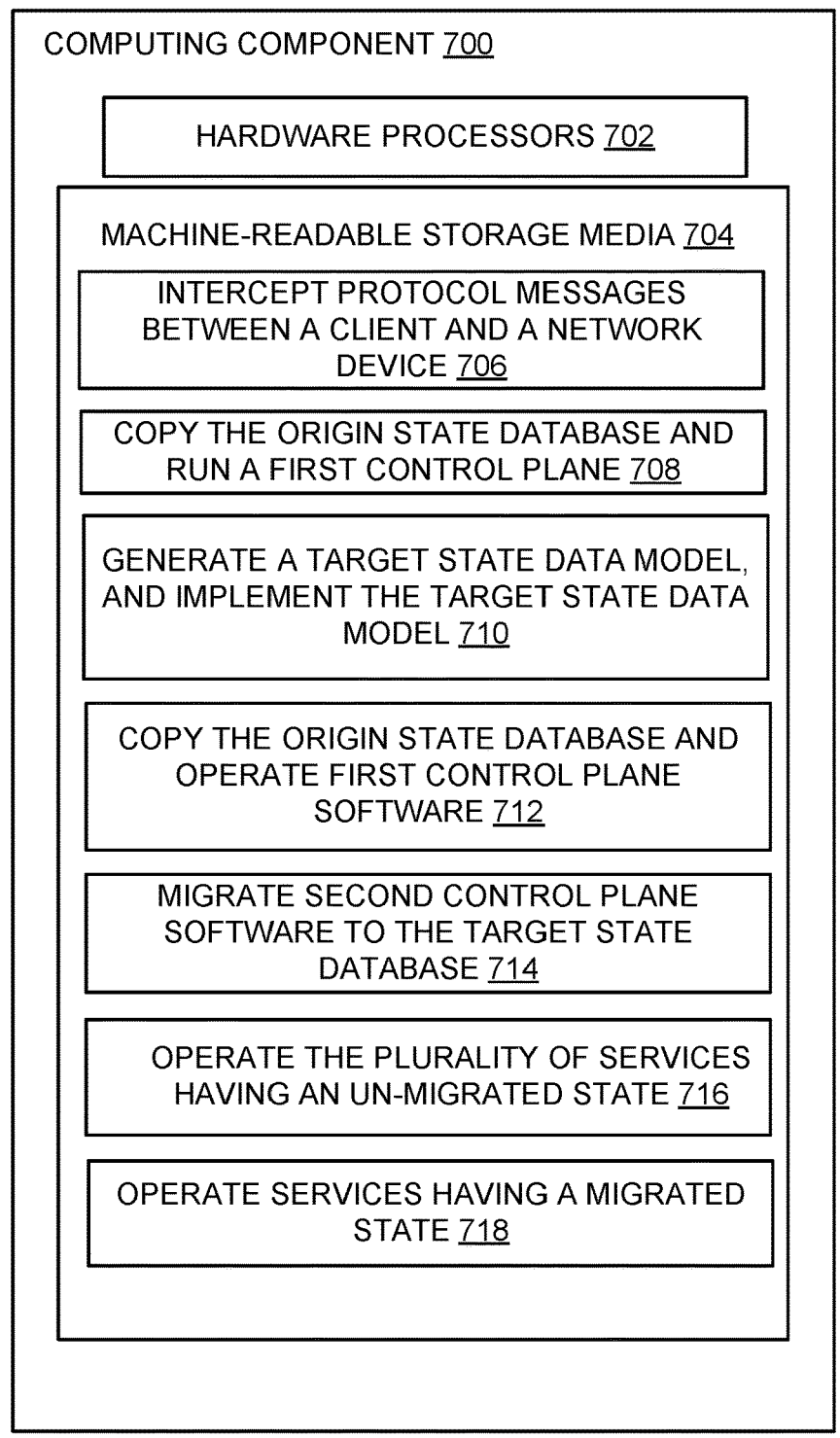
FIG. 7 illustrates an example method executable by a computing component in accordance with one example.

FIG. 7 illustrates an example computing component that may be used to implement ISSU in accordance with an aspect of the disclosed technology. Referring now to FIG. 7, computing component 700 may be, for example, a server computer, a controller, or any other similar computing component capable of processing data. In the example implementation of FIG. 7, the computing component 700 includes a hardware processor 702, and machine-readable storage medium for hardware processor 702.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions, such as instructions 706-718, to control processes or operations for burst preloading for available bandwidth estimation. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-718.

Hardware processor 702 may execute instruction 706 to intercept protocol messages between a client and a network device. As described above, the management software can include networking protocols, e.g., Spanning Tree Protocol (STP), Open Shortest Path First (OSPF) protocol, Border Gateway Protocol (BGP), etc. Certain protocols may be defined as critical such the system can be configured to monitor network events relevant to the critical protocols.

Hardware processor 702 may execute instruction 708 to copy the origin state and run a first control plane, wherein the first control plane comprises the origin state database and a plurality of services having an un-migrated state. As described above, a copy of the origin state database can be retained in the origin version to continue running services on the old software. Copying can comprise implementing a smart "copy-on-write" mechanism that only duplicates what becomes different, thereby reducing the memory requirements for the copied state database. Copying may comprise copying only the data-plane state information included in the state database. This way, the ISSU database only contains the data-plane state of the switch at the current time instant. As described above, the copied state database can enable the detachment between data plane management features and the control plane. The plurality of services having an un-migrated state can continue to operate on old software while new software can be implemented, allowing other services to migrate simultaneously to the new software.

Hardware processor 702 may execute instruction 710 to translate the intercepted OVSDB protocol messages to generate a target state data model, and implementing the target state data model on a target state database, wherein an origin state data model associated with the origin state database migrates to the target state data model. As described above, the target state database can comprise the updated state database after the schema migration is accomplished. A copy of the origin state database can be retained in an origin version 402 to continue running services. As described above, the system can establish a proxy session with northbound and southbound communication sessions while providing an interface for services and databases in both the origin and target versions to communicate across the different types of software.

Hardware processor 702 may execute instruction 712 to copy the origin state database and operate first control plane software in accordance with the copied origin state database. As described above, versioning can involve assigning unique version names and/or version numbers corresponding to new developments in the software. Copying can be accomplished through a schema migration framework OVSDB proxy (described further below) which can perform a live migration of the origin version's data model to the target's model. The target version may be migrated inside a container, virtualized machine, or a standby or active redundant management module. Copying can comprise implementing a smart "copy-on-write" mechanism that only duplicates what becomes different, thereby reducing the memory requirements for the copied state database. Copying may comprise copying only the data-plane state information included in the state database.

Hardware processor 702 may execute instruction 714 to migrate second control plane software to the target state database. As described above, the schema migration framework OVSDB proxy can perform a live migration of the origin version's data model to the target's model. Services can be migrated after the state database and any other configuration modules are migrated to the target version. This can be accomplished by stopping the process providing the old software services and starting a new process on the new software version. The new software can be deployed on a standby management module or as a hot patch. The sequence of stopping and starting processes can be repeated until all services are migrated. When all processes are migrated the old state database may be stopped to return the system to a single centralized database, i.e. with the target state database as the sole database.

Hardware processor 702 may execute instruction 716 to operate the plurality of services having an un-migrated state in accordance with the first control plane software and the copied origin state database. While services are migrated to the target state database, the old services having an un-migrated state can operate via the copy of the origin state database. The sequence of stopping and starting processes can be repeated until all services are migrated. The schema migration may allow old services to publish data to the target state database and allow new services to send data to old state database (e.g. database 606) to communicate with old services.

Hardware processor 702 may execute instruction 718 to operate services having a migrated state in accordance with the second control plane software and the target state database. As described above, while processes are migrating, the migrated services can operate via the target state database, while un-migrated services can operate via the copy of the origin state database. When all processes are migrated the old state database may be stopped to return the system to a single centralized database. This can be accomplished by disconnecting the target state database from the origin state database.

Figure 8:
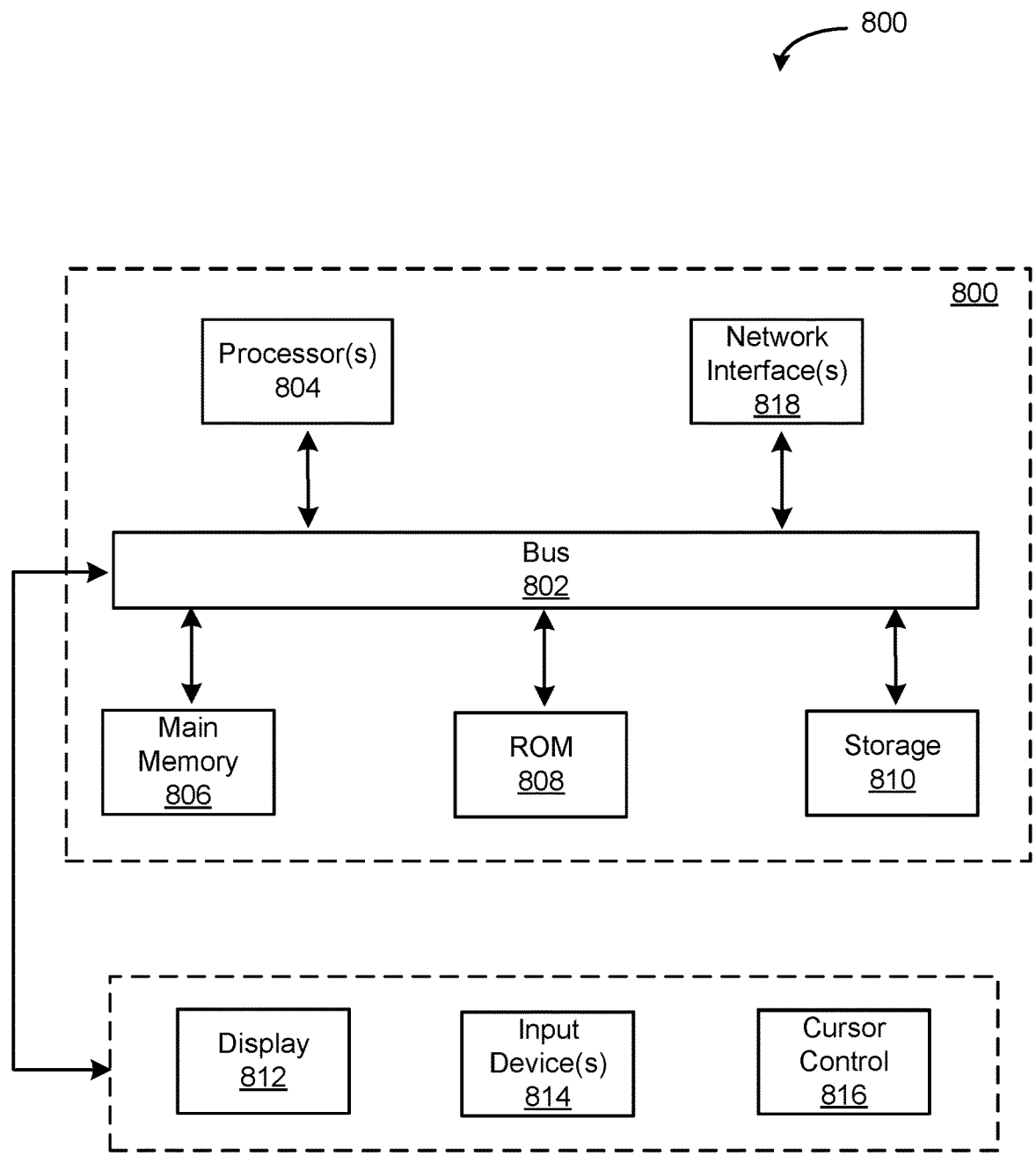
FIG. 8 illustrates an example computing component that may be used to implement various features of examples described in the present disclosure.

FIG. 8 depicts a block diagram of an example computer system 800 in which various of the examples described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some examples, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one example, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
intercepting protocol messages between a client and a network device, wherein operation of the network device is controlled in accordance with an origin state database;
running a first control plane, wherein the first control plane comprises the origin state database and a plurality of services having an un-migrated state;
generating a target state data model based on the intercepted protocol messages, and implementing the target state data model on a target state database, wherein an origin state data model associated with the origin state database migrates to the target state data model;
copying the origin state database and operating first control plane software in accordance with the copied origin state database;
migrating second control plane software to the target state database;
operating the plurality of services having the un-migrated state in accordance with the first control plane software and the copied origin state database;
operating a plurality of services having a migrated state in accordance with the second control plane software and the target state database; and
migrating the plurality of services having the un-migrated state to the target state database.

2. The method of claim 1, wherein copying the origin state database comprises copying data-plane state information included in the origin state database.

3. The method of claim 1, wherein the origin state database comprises a centralized database with bidirectional connections between the centralized database and the plurality of services having the un-migrated state.

4. The method of claim 3, wherein the origin state database is part of an Open vSwitch Database (OVSDB) of a switch operating system.

5. The method of claim 1, further comprising migrating the plurality of services having the un-migrated state to the target state database.

6. The method of claim 5, wherein generating the target state data model based on the intercepted protocol messages comprises establishing a proxy session to translate data between the origin state database and the target state database.

7. The method of claim 6, further comprising ending the proxy session to disconnect the target state database from the origin state database after the plurality of services having the un-migrated state migrates to the target state database.

8. The method of claim 1, wherein the origin state database comprises state information associated with the first control plane and state information associated with a data plane of the network device.

9. A system comprising:
a hardware processor; and
a non-transitory machine-readable storage medium encoded with instructions executable by the hardware processor to:
intercept protocol messages between a client and a network device, wherein operation of the network device is controlled in accordance with an origin state database;
run a first control plane, wherein the first control plane comprises the origin state database and a plurality of services having an un-migrated state;
generate a target state data model based on the intercepted protocol messages, and implement the target state data model on a target state database, wherein an origin state data model associated with the origin state database migrates to the target state data model;
copy the origin state database and operate first control plane software in accordance with the copied origin state database;
migrate second control plane software to the target state database;
operate the plurality of services having the un-migrated state in accordance with the first control plane software and the copied origin state database;
operate a plurality of services having a migrated state in accordance with the second control plane software and the target state database; and
migrate the plurality of services having the un-migrated state to the target state database.

10. The system of claim 9, wherein copying the origin state database comprises copying data-plane state information included in the origin state database.

11. The system of claim 9, wherein the origin state database comprises a centralized database with bidirectional connections between the centralized database and the plurality of services having the un-migrated state.

12. The system of claim 11, wherein the origin state database is part of an Open vSwitch Database (OVSDB) of a switch operating system.

13. The system of claim 9, wherein generating the target state data model based on the intercepted protocol messages comprises establishing a proxy session to translate data between the origin state database and the target state database.

14. The system of claim 13, further comprising ending the proxy session to disconnect the target state database from the origin state database after the plurality of services having the un-migrated state migrates to the target state database.

15. The system of claim 9, wherein the origin state database comprises state information associated with the first control plane and state information associated with a data plane of the network device.

16. A non-transitory machine-readable storage medium storing a plurality of instructions executable by one or more processors, wherein the plurality of instructions, when executed by the one or more processors, cause the one or more processors to:
- intercept protocol messages between a client and a network device, wherein operation of the network device is controlled in accordance with an origin state database;
- run a first control plane, wherein the first control plane comprises the origin state database and a plurality of services having an un-migrated state;
- generate a target state data model based on the intercepted protocol messages, and implement the target state data model on a target state database, wherein an origin state data model associated with the origin state database migrates to the target state data model;
- copy the origin state database and operate first control plane software in accordance with the copied origin state database;
- migrate second control plane software to the target state database;
- operate the plurality of services having the un-migrated state in accordance with the first control plane software and the copied origin state database;
- operate a plurality of services having a migrated state in accordance with the second control plane software and the target state database; and
- migrate the plurality of services having the un-migrated state to the target state database.

17. The non-transitory machine-readable storage medium of claim 16, wherein copying the origin state database comprises copying data-plane state information included in the origin state database.

18. The non-transitory machine-readable storage medium of claim 16, wherein the origin state database comprises a centralized database with bidirectional connections between the centralized database and the plurality of services having the un-migrated state.

19. The non-transitory machine-readable storage medium of claim 16, wherein generating the target state data model based on the intercepted protocol messages comprises establishing a proxy session to translate data between the origin state database and the target state database.

20. The non-transitory machine-readable storage medium of claim 19, wherein the plurality of instructions, when executed by the one or more processors, further cause the one or more processors to end the proxy session to disconnect the target state database from the origin state database after the plurality of services having the un-migrated state migrates to the target state database.

* * * * *